US005802717A

United States Patent [19]

Murakami

[11] Patent Number: 5,802,717

[45] Date of Patent: *Sep. 8, 1998

[54] PROCESS FOR PRODUCING INK-JET HEAD WITH A CHEMICAL CHANGE IN THE BASE PLATE SURFACE

[75] Inventor: Keiichi Murakami, Hachioji, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 575,152

[22] Filed: Dec. 19, 1995

[30] Foreign Application Priority Data

Dec. 21, 1994 [JP] Japan .................................... 6-335709

[51] Int. Cl.[6] ..................................................... B23P 15/00

[52] U.S. Cl. ............................................. 29/890.1; 347/45

[58] Field of Search .................................... 29/890.1, 611; 347/45, 65; 148/257, 258, 264

[56] References Cited

U.S. PATENT DOCUMENTS

| | | | |
|---|---|---|---|
| 4,368,476 | 1/1983 | Uehara | 347/45 |
| 5,491,505 | 2/1996 | Suzuki et al. | 347/203 |

FOREIGN PATENT DOCUMENTS

| | | | |
|---|---|---|---|
| 5-254128 | 10/1993 | Japan | 347/45 |
| 6-198894 | 7/1994 | Japan | 347/45 |

OTHER PUBLICATIONS

Baker, R.W., Surface Treatment of Nozzles for Ink Jet Printers, IBM Tech. Discl. Bull., vol. 22, No. 5, Oct. '79, p. 1965.

Balanson, R.D. et al., Low Energy Coating for Drop–on–Demand Silicon Nozzles, IBM. Tech. Disc. Bull., vol. 23, No. 1, Jun. 1980, p. 294.

*Primary Examiner*—P. W. Echols
*Attorney, Agent, or Firm*—Fitzpatrick, Cella, Harper & Scinto

[57] ABSTRACT

A process for producing an ink-jet head having an ink discharge opening for discharging an ink, an ink flow path communicating with the ink discharge opening, a liquid chamber communicating with the ink flow path for supplying the ink thereto, an energy-generating element for generating energy to be utilized for discharging the ink, and a metallic base plate provided with the energy-generating element is disclosed. The process comprises the steps of providing a metallic base plate having thereon a plurality of the energy-generating elements, forming, on the base plate, a plurality of ink flow path walls from a resin for forming the plurality of ink flow paths and the liquid chambers, bonding a ceiling plate onto the ink flow path walls, cutting the formed laminate of the metallic base plate and the ceiling plate having the ink flow path walls interposed therebetween into a plurality of laminate pieces, and immersing into a chemical treatment solution at least an end portion having that cut face of the cut faces of the respective laminate pieces which forms an ink discharge opening surface having the discharge opening formed therethrough.

12 Claims, 1 Drawing Sheet

PROCESS FOR PRODUCING INK-JET HEAD WITH A CHEMICAL CHANGE IN THE BASE PLATE SURFACE

BACKGROUND OF THE INVENTION

1. Field of the Invention

The present invention relates to a process for producing an ink-jet head.

2. Related Background Art

The ink-jet apparatus is a printing apparatus which conducts printing by discharging an ink through an ink discharge opening of an ink-jet head onto a printing medium like a paper sheet. The ink-jet printing apparatus has many advantages such as less generation of noise, capability of high speed printing, and capability of printing on a plain paper sheet without using a special paper sheet.

The ink-jet head employed in the ink-jet apparatus comprises generally an ink discharge opening for discharging an ink, an ink flow path communicating with the ink discharge opening, a liquid chamber for supplying the ink to the ink flow path, an energy-generating element for generating energy to be utilized for ink discharge, and a base plate provided with the energy-generating element.

A base plate for the ink-jet head is made preferably from a material having a high thermal conductivity, and suitable surface properties. To meet the requirements, a silicon base plate is used conventionally for the substrate of the ink-jet head. The silicon base plate is usually cut out in a square shape from a circular silicon wafer. With increase of the size of the silicon base plate, the number of the square base plates cut out from a wafer becomes less. Further, the silicon wafer itself is expensive. For these reasons, various inexpensive materials have been investigated for the base plate for the ink-jet head to substitute for the silicon base plate. Of the proposed substituting base plates, metal base plates typified by an aluminum base plate are attracting attention in recent years because of high thermal conductivity, satisfactory surface properties, and inexpensiveness thereof. The metal base plates are easy to fabricate, and producible in a large square shape from which a larger number of base plates can be cut out, in comparison with the silicon base plates.

For the aforementioned constitution of the ink-jet head, the ink discharge opening and the ink flow path are made, for example, through the steps below. Plural energy-generating elements are formed on a large plate such as a silicon wafer according to a conventional film-forming technique of semiconductor industry; a photosensitive resin film is laid on the large plate; walls of grooves for the ink flow paths are formed by photolithography; a ceiling plate is bonded with interposition of the groove walls onto the large plate to form a laminate having the ink flow paths; and the formed laminate is cut by dicing or a like method into plural ink-jet heads to form ink discharge openings at the cut portions (sections) at the downstream side in the ink feed direction of the ink flow paths.

In the above mentioned method in which ink discharge openings are formed by cutting a laminate, when a metal such as aluminum is used as the base plate material, the metal base plate is exposed at the cut end of the laminate through which the ink discharge openings are formed (ink discharge opening surface), and the metal base plate material, which is less corrosion-resistant, is corroded by ink to lower the performance of the ink-jet head, or in an extreme case, the corrosion product may clog the ink discharge opening to cause failure of ink discharge. Even if the ink is non-corrosive, corrosion may also be caused by air-moisture, sodium ion, or chloride ion.

Accordingly, the metal employed as the ink-jet head base plate has to be provided with some film at the end face of the laminate which forms the ink discharge opening surface.

The film is formed conventionally by resin coating, sputtering, vapor deposition, or plasma polymerization or the like on the discharge opening surface. However, when the film is thin, pin holes or the like defects are formed therein, failing to protect the discharge opening surface completely against the corrosion, and when the film is thick, it may peel off or crack to cause corrosion of the base plate material from such defective sites. Further, the ink discharge opening of the ink-jet head is wiped by a cleaning blade provided in the ink-jet apparatus in practical use repeatedly. Thereby the film is liable to cause peeling off when the adhesiveness of the film onto the substrate is not sufficient. Since, in the above production process, the ink discharge opening surface is formed of plural materials (namely, the base plate, the groove walls, and the ceiling plate), the film is formed not only on the end face of the base plate but also the end faces of groove walls (ink flow path walls) and of the ceiling plate. Therefore, the film is required to have sufficient adhesiveness to the respective constituent materials. The films which are used conventionally do not necessarily posses the requisite adhesiveness, and so their use may be disadvantageous.

SUMMARY OF THE INVENTION

The present invention has been achieved to offset the above disadvantages.

According to an aspect of the present invention, there is provided a process for producing an ink-jet head having an ink discharge opening for discharging an ink, an ink flow path communicating with the ink discharge opening, a liquid chamber communicating with the ink flow path for supplying the ink thereto, an energy-generating element for generating energy to be utilized for discharging the ink, and a metallic base plate provided with the energy-generating element: the process comprising the steps of providing a metallic base plate having thereon a plurality of the energy-generating elements; forming, on the base plate, a plurality of ink flow path walls from a resin for forming the plurality of ink flow paths and the liquid chambers; bonding a ceiling plate onto the ink flow path walls; cutting the formed laminate of the metallic base plate and the ceiling plate having the ink flow path walls interposed therebetween into a plurality of laminate pieces; and immersing into a chemical treatment solution at least an end portion having that cut face of the cut faces of the respective laminate pieces which forms an ink discharge opening surface having the discharge opening formed therethrough.

According to another aspect of the present invention, there is provided another process for producing an ink-jet head having an ink discharge opening for discharging an ink, an ink flow path communicating with the ink discharge opening, a liquid chamber communicating with the ink flow path for supplying the ink thereto, an energy-generating element for generating energy to be utilized for discharging the ink, and a metallic base plate provided with the energy-generating element, the process comprising the steps of providing a metallic base plate having thereon a plurality of the energy-generating elements; forming, on the base plate, a plurality of resinous solid layers in a pattern of the ink flow paths and the liquid chambers; forming a resin layer for constituting the ink flow path walls on the base plate having the solid layers thereon; bonding a ceiling plate on the resin layer to form a laminate of the metallic base plate and the ceiling plate with the resin layer interposed therebetween; curing the resin layer of the laminate; cutting the formed laminate having the cured resin layer into a plurality of laminate pieces; immersing into a chemical treatment solution at least an end portion having that cut face of the cut faces of the respective laminate pieces which forms an ink discharge opening surface having the discharge opening formed therethrough; and removing the solid layer by dissolution to form the ink flow path walls and the liquid chamber defined by the base plate, the cured resin layer, and the ceiling plate.

The present invention enables formation of a protecting film to protect the base plate material against ink by surface modification by simply immersing into a chemical treatment solution an end portion of the laminate having the ink discharge opening surface. Accordingly, the protecting film has high adhesiveness to the base plate to prevent surely the corrosion of the base plate material, thereby enabling the production of an ink-jet head which does not cause peeling off or cracking of the film.

The present invention provides an ink-jet head which conducts printing satisfactorily without causing lowering of the performance by corrosion by ink or clogging of the ink discharge opening by a corrosion product.

DESCRIPTION OF THE PREFERRED EMBODIMENTS

The present invention is described by reference to drawings.

Figure 1A:
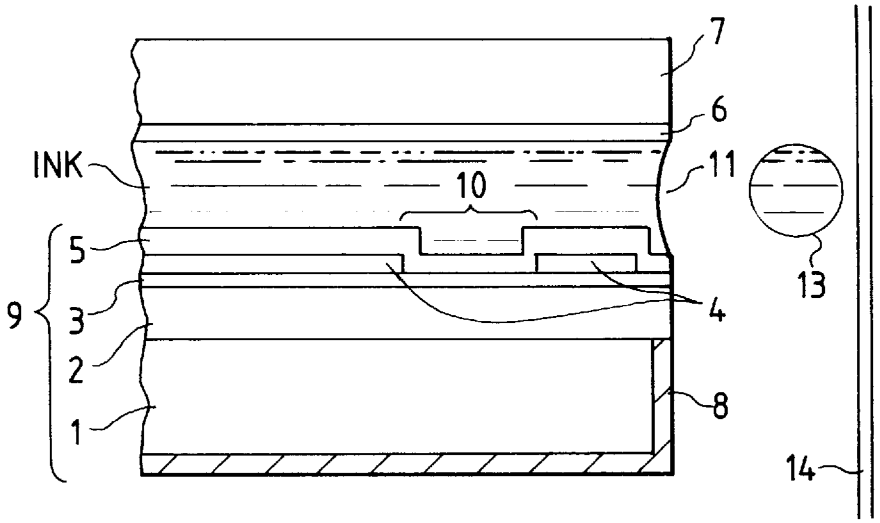
FIG. 1A is a schematic cross-sectional view of the main portion of an example of the ink-jet head of the present invention.
Figure 1B:
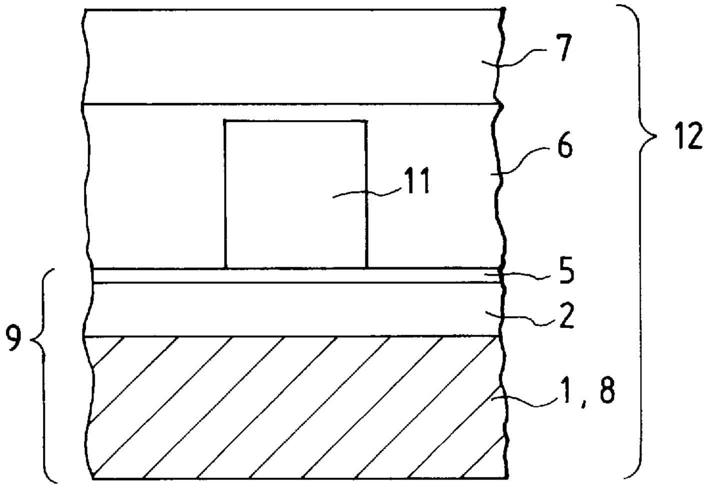
FIG. 1B is a schematic front view of the ink-jet head shown in FIG. 1A.

FIG. 1A is a schematic cross-sectional view of the main portion of an example of the ink-jet head of the present invention, and FIG. 1B is a schematic front view of the ink-jet head shown in FIG. 1A.

The ink-jet head illustrated in FIGS. 1A and 1B is formed of a laminate constituted of ink flow path wall forming members 6 for ink flow path walls composed, for example, of a photosensitive resin, a substrate 9 for the ink-jet head having a metal base plate, and a ceiling plate 7 made, for example, of a glass or a metal.

The ink-jet head substrate 9 is constituted of a base plate 1 mainly composed of a metal, a heat-accumulating layer 2 composed of an inorganic oxide such as silicon oxide formed on the base plate 1, a heat-generating resistance layer 3 and electrodes 4 serving as an energy-generating element, and a protecting layer 5 for protecting the energy-generating element from the ink. The heat-generating resistance layer, the electrodes, and the protecting layer are respectively formed by a vacuum film-forming technique conventionally employed in semiconductor industry. The examples of the construction materials for the heat-generating resistance layer, the electrode, and the protecting layer are respectively tantalum nitride and hafnium boride; aluminum and copper; and silicon oxide and aluminum oxide. In this example, an electro-thermal transducer is employed as the energy-generating element. The electro-thermal transducer generates abruptly at the heat exerting portion 10 on application of electric signal, and forms a bubble in the ink by change of the state of the ink contacting with the heat exerting portion. The pressure of the generated bubble discharges an ink droplet 13 through the ink discharge opening 11 to deposit the ink drop 13 onto a printing medium 14 to form a printed image.

The end portion including the ink discharge opening surface 12 of the laminate has an oxide film 8 having formed by treatment with a chemical treatment solution as mentioned above. The chemical treatment in the present invention includes the Alodine method employing an aqueous acidic solution containing a chromic acid (salt), a phosphoric acid (salt), and a fluoride; the MBV method employing an aqueous solution containing sodium hydroxide, and sodium chromate; and the EW method employing an aqueous solution containing sodium carbonate, sodium chromate, and sodium silicate. The oxide film formed by the chemical treatment is less liable to be formed in a porous state, thereby covering surely the possible ink-contacting portions of the base plate material to protect them.

When a metal base plate is used as part of an ink-jet head substrate, there can be great differences in the linear expansion coefficients of the metal base plate and the ink flow path walls, which are made from resin. Thus, thermal stress can be generated by changes in temperature of the head substrate, and that stress may cause peeling of the ink flow path walls from the metal base plate. According to the present invention, the laminate need not be exposed to high temperature as in surface modification of the base plate material by thermal oxidation. Thereby, the liability of peeling off of the resinous ink flow path walls from the metal base plate caused by the above-mentioned linear expansion coefficient difference can be reduced greatly.

When the ceiling plate is a metal plate, similarly as the material for the ink-jet head base plate, the protecting film can be formed for the ceiling plate and the base plate simultaneously.

In the present invention, an oxide film 8 is formed at the end portion of the laminate including the ink discharge opening surface 12 by surface modification of the base plate material mainly composed of a metal. Therefore, the oxide film prevents the corrosion of the base plate material and serves to keep satisfactory ink discharge characteristics even if the end portion of the metal base plate is brought into contact with ink drops.

The chemical treatment is conducted by immersing the end portion of the laminate having the ink discharge opening surface into a chemical conversion treatment solution. Therefore, a measure should be taken to prevent penetration of the treatment solution into the ink flow path, if necessary. The penetration of the treatment solution can be prevented by employing a process of the present invention for producing an ink-jet head having an ink discharge opening for discharging an ink, an ink flow path communicating with the ink discharge opening, a liquid chamber communicating with the ink flow path for supplying the ink thereto, an energy-generating element for generating energy to be utilized for discharging the ink, and a metallic base plate provided with the energy-generating element: the process comprising the steps of providing a metallic base plate having thereon a plurality of the energy-generating elements; forming, on the base plate, a plurality of resinous solid layers in a pattern of the ink flow paths and the liquid chambers; forming a resin layer for constituting the ink flow path walls on the base plate having the solid layers formed thereon, bonding a ceiling plate on the resin layer to form a laminate of the metallic base plate and the ceiling plate with the resin layer interposed therebetween; curing the resin layer of the laminate; cutting the formed laminate having the cured resin layer into a plurality of laminate pieces; immersing into a chemical treatment solution at least an end portion having that cut face of the cut faces of the respective laminate pieces which forms an ink discharge opening surface having the discharge opening formed therethrough; and removing the solid layer by dissolution to form the ink flow path walls and the liquid chamber defined by the base plate, the cured resin layer, and the ceiling plate.

In this method, the solid layer, which is provided for forming the ink flow paths and the liquid chamber, fill the ink flow paths and the liquid chamber, thereby preventing the penetration of the chemical treatment solution therein, and further preventing cracking or chipping of the end portion of the laminate, in the step of cutting of the laminate, by supporting the base plate and the ceiling plate to reduce vibration thereof.

On the other hand, the ink discharge opening surface of the ink-jet head is sometimes treated for water-repellence to discharge the ink from the respective ink discharge openings with uniform ejection characteristics. This water-repellant treatment is usually conducted by application of a water-repelling resin onto the ink discharge opening surface. In the present invention, the surface of the resin forming the ink flow path walls is roughened slightly by the chemical treatment solution in the chemical treatment, whereby the adhesiveness of the water-repelling resin thereto is improved simultaneously with formation of the oxide film on the end portion of the base plate.

The present invention is described by reference to examples below.

Example 1

An ink-jet head illustrated in FIGS. 1A and 1B having no oxide film at the end portion of the base plate was prepared by employing an aluminum plate as the base plate.

The tip portion of this head was treated by the Alodine method by immersion into an acidic solution containing phosphoric acid, sodium fluoride, and chromic acid at the respective concentrations shown in Table 2 at 50° C. for 3 minutes to form an oxide film of about 300 nm thick on the end portion of the base plate including the ink discharge opening surface.

The resulting ink-jet head in this Example 1 was compared with the one (Comparative Example) of the same constitution except for absence of the oxide film with the aluminum uncovered at the end portion thereof. As the results, the ink-jet head of Example 1 had excellent discharge characteristics without corrosion of the aluminum at the end face of the base plate which forms the ink discharge opening surface in comparison with the one of Comparative Example as shown in Table 1.

Example 2

On the face of an ink-jet head having the same constitution as the ink-jet head of Example 1, an oxide film was formed in a thickness of about 300 nm according to the MBV method. Specifically, the tip portion of the head was treated by the MBV method by immersion into an aqueous solution containing sodium hydroxide and sodium chromate at the respective concentrations shown in Table 2 at 96° C. for 6 minutes to form an oxide film of about 300 nm thick on the end portion of the base plate forming the ink discharge opening surface.

The resulting ink-jet head in this Example 2 was compared with the one (Comparative Example) of the same constitution as above except for absence of the oxide film with the aluminum uncovered at the end portion thereof. As the results show, the ink-jet head of Example 2 had excellent discharge characteristics without corrosion of the aluminum at the end face of the base plate which forms the ink discharge opening surface as compared with the comparative example, which results are shown in Table 1.

Example 3

On the face of an ink-jet head having the same constitution as the ink-jet head of Example 1, an oxide film was formed in a thickness of about 300 nm according to the EW method. Specifically, the tip portion of the head was treated by the EW method by immersion into a solution containing sodium carbonate, sodium chromate, and sodium silicate at the respective concentrations shown in Table 2 at 95° C. for 9 minutes to form an oxide film of about 300 nm thick on the end portion of the base plate forming the ink discharge opening surface.

The resulting ink-jet head in this Example 3 was compared with the one (Comparative Example) of the same constitution as above except for absence of the oxide film with the aluminum uncovered at the end portion thereof. As the results, the ink-jet head of Example 3 had excellent discharge characteristics without corrosion of the aluminum at the end face of the base plate which forms the ink discharge opening surface in comparison with the one of Comparative Example as shown in Table 1.

TABLE 1

| | Letter printing test for 100 hours | |
|---|---|---|
| | Corrosion of aluminum base plate | Printing results |
| Example 1 | None | Good |
| Example 2 | None | Good |
| Example 3 | None | Good |
| Comparative Example | Corrosion generated at end face of base plate of ink discharge opening surface | Irregular discharge and distorted print generated |

TABLE 2

| | Chemical treatment method | Solution composition | | Solution temperature | Immersion time |
|---|---|---|---|---|---|
| Example 1 | Alodine method | 75% $H_3PO_4$ | 64 g/L | 50° C. | 3 min |
| | | NaF | 5 g/L | | |
| | | $CrO_3$ | 10 g/L | | |
| Example 2 | MBV method | NaOH | 5% | 96° C. | 6 min |
| | | $Na_2CrO_4$ | 1.5% | | |
| Example 3 | EW method | $Na_2CO_3$ | 51.3 g/L | 95° C. | 9 min |
| | | $Na_2CrO_4$ | 15.4 g/L | | |
| | | Na silicate | 0.07 g/L | | |

What is claimed is:

1. A process for producing an ink-jet head having an ink discharge opening for discharging an ink, an ink flow path communicating with the ink discharge opening, a liquid chamber communicating with the ink flow path for supplying the ink thereto, an energy-generating element for generating energy to be utilized for discharging the ink, and a metallic base plate provided with the energy-generating element, said process comprising the steps of providing a metallic base plate having thereon a plurality of the energy-generating elements; forming, on the base plate, a plurality of ink flow path walls from a resin for forming the plurality of ink flow paths and the liquid chambers; bonding a ceiling plate onto the ink flow path walls; cutting the formed laminate of the metallic base plate and the ceiling plate having the ink flow path walls interposed therebetween into a plurality of laminate pieces; and immersing into a chemical treatment solution at least an end portion having that cut face of the cut faces of the respective laminate pieces which forms an ink discharge opening surface having the discharge opening formed therethrough, the immersing in the chemical treatment solution causing a chemical change in the surface of the metallic base plate.

2. The process for producing an ink-jet head according to claim 1, wherein the ceiling plate is made of a metal.

3. The process for producing an ink-jet head according to claim 2, further comprising the step of subjecting the chemically treated ink discharge opening surface to a water-repellant treatment.

4. The process for producing an ink-jet head according to claim 1, further comprising the step of subjecting the chemically treated ink discharge opening surface to a water-repellant treatment.

5. The process for producing an ink-jet head according to claim 1, wherein the chemical treatment is conducted by any one of the Alodine method, the MBV method, and the EW method.

6. The process for producing an ink-jet head according to claim 1, wherein the ink flow path walls are formed by patterning a resin.

7. A process for producing an ink-jet head having an ink discharge opening for discharging an ink, an ink flow path communicating with the ink discharge opening, a liquid chamber communicating with the ink flow path for supplying the ink thereto, an energy-generating element for generating energy to be utilized for discharging the ink, and a metallic base plate provided with the energy-generating element, said process comprising the steps of providing a metallic base plate having thereon a plurality of the energy-generating elements; forming, on the base plate, a plurality of resinous solid layers in a pattern of the ink flow paths and the liquid chambers; forming a resin layer for constituting the ink flow path walls on the base plate having the solid layers formed thereon; bonding a ceiling plate on the resin layer to form a laminate of the metallic base plate and the ceiling plate with the resin layer interposed therebetween; curing the resin layer of the laminate; cutting the formed laminate having the cured resin layer into a plurality of laminate pieces; immersing into a chemical treatment solution at least an end portion having that cut face of the cut faces of the respective laminate pieces which forms an ink discharge opening surface having the discharge opening formed therethrough, the immersing in the chemical treatment solution causing a chemical change in the surface of the metallic base plate; and removing the solid layer by dissolution to form the ink flow path walls and the liquid chamber defined by the base plate, the cured resin layer, and the ceiling plate.

8. The process for producing an ink-jet head according to claim 7, wherein the ceiling plate is made of a metal.

9. The process for producing an ink-jet head according to claim 8, further comprising the step of subjecting the chemically treated ink discharge opening surface to a water-repellant treatmenet.

10. The process for producing an ink-jet head according to claim 7, further comprising the step of subjecting the chemically treated ink discharge opening surface to a water-repellant treatment.

11. The process for producing an ink-jet head according to claim 7, wherein the chemical treatment is conducted by any one of the Alodine method, the MBV method, and the EW method.

12. The process for producing an ink-jet head according to claim 7, wherein the ink flow path walls are formed by patterning a resin.

* * * * *